United States Patent
Kawagoe et al.

(10) Patent No.: US 7,712,964 B2
(45) Date of Patent: May 11, 2010

(54) SLIDING BEARING

(75) Inventors: Kimio Kawagoe, Aichi (JP); Katsuyuki Hashizume, Aichi (JP); Yoshio Fuwa, Aichi (JP)

(73) Assignee: Taiho Kogyo Co., Ltd., Aichi (JP)

( * ) Notice: Subject to any disclaimer, the term of this patent is extended or adjusted under 35 U.S.C. 154(b) by 1088 days.

(21) Appl. No.: 10/513,029

(22) PCT Filed: Feb. 13, 2004

(86) PCT No.: PCT/JP2004/001524

§ 371 (c)(1),
(2), (4) Date: Nov. 1, 2004

(87) PCT Pub. No.: WO2004/072499

PCT Pub. Date: Aug. 26, 2004

(65) Prior Publication Data

US 2005/0157964 A1      Jul. 21, 2005

(30) Foreign Application Priority Data

Feb. 17, 2003   (JP) ............................. 2003-038625

(51) Int. Cl.
*F16C 33/20* (2006.01)
(52) U.S. Cl. ................... 384/276; 384/625; 384/907
(58) Field of Classification Search ............... 384/276, 384/625, 907
See application file for complete search history.

(56) References Cited

U.S. PATENT DOCUMENTS

| 4,623,590 | A | 11/1986 | Hodes et al. |
| 5,229,484 | A | 7/1993 | Wolf et al. |

FOREIGN PATENT DOCUMENTS

| CN | 1388872 A | 1/2003 |
| EP | 0 120 130 A1 | 10/1984 |
| EP | 1 236 914 A1 | 9/2002 |
| JP | 4-83914 A | 3/1992 |
| JP | 7-247493 A | 9/1995 |
| JP | 8-92528 A | 4/1996 |
| JP | 9-272799 A | 10/1997 |
| JP | 2001-097519 A | 4/2001 |
| JP | 2002-61652 A | 2/2002 |
| WO | WO 02/14703 A | 2/2002 |

OTHER PUBLICATIONS

Supplementary European Search Report dated Sep. 6, 2006.
Chinese Office Action dated Mar. 23, 2007.
International Search Report dated May 11, 2004.
Submission of Published Document filed Dec. 27, 2005 in Japanese Patent Application No. 2004- 263727.
Material Technology 12 Structural Material II Nonmetallic system; Foundation of University of Tokyo Press, 1$^{st}$ Edition, May 10, 1985, p. 13, lines 34-32.
Polyamide resin handbook; The Nikkan Kogyo Shimbum, Ltd., 1$^{st}$ Edition Jan. 30, 1986, p. 519, lines 7-11.
Introduction of Polymer Molecule, The Nikkan Kogyo Shimbun Ltd., 19$^{th}$ Edition, Apr. 30, 1999, p. 324 last 4 lines.

*Primary Examiner*—William C Joyce
(74) *Attorney, Agent, or Firm*—Sughrue Mion, PLLC

(57) ABSTRACT

A sliding bearing having excellent initial conformability and seizure resistance as well as high durability and heat resistance is provided. A sliding bearing comprising a coating layer containing a resin and a solid lubricant formed on a bearing alloy layer, characterized in that the resin of said coating layer is a resin having a glass transition temperature of from 150° C. to 250° C. which has a great elongation at high temperatures.

10 Claims, No Drawings

SLIDING BEARING

TECHNICAL FIELD

The present invention relates to a sliding bearing for use in internal combustion engine (engine) for automobile or other industrial machines.

BACKGROUND ART

A sliding bearing for automobile engine is normally made of aluminum alloy or copper-lead alloy with Pb-based overlay. In the art of this kind of a sliding bearing, it has heretofore been practiced to enhance the abrasion resistance, seizure resistance and initial conformability of the sliding bearing by coating the surface of the bearing alloy layer with a coating layer comprising a solid lubricant incorporated in a resin such as polyamide-imide, polyimide and epoxy resin.

For example, Patent Reference 1 (JP-A-4-83914) discloses that the use of a sliding bearing material having a coating layer made of from 55 to 90% by weight of a solid lubricant and from 10 to 45% by weight of a polyimide-based binder formed on the surface of an aluminum bearing alloy makes it possible to enhance the initial conformability of the aluminum alloy bearing and have excellent fatigue resistance and seizure resistance.

Further, Patent Reference 2 (JP-A-7-247493) discloses that the addition of a film forming aid to a solid lubricant film made of from 70 to 97% by weight of a solid lubricant and from 3 to 30% by weight of a resin selected from polyimide resin, epoxy resin and phenolic resin makes it possible to provide firm retention of solid lubricant and good conformability that give excellent seizure resistance which prevents exfoliation and hence enhances abrasion resistance.

On the other hand, Patent Reference 3 (JP-A-2002-61652) discloses a sliding bearing comprising a resin coating layer formed on a bearing alloy layer, which resin coating layer comprises a soft high-temperature extensible thermosetting resin having a tensile strength of from 70 to 110 MPa and an elongation of from 7 to 20% at 25° C. and a tensile strength of 15 MPA or more and an elongation of 20% or more at 200° C. and a solid lubricant in an amount of from 70 to 30 vol-% and from 30 to 70 vol-%, respectively, and has a Vickers hardness Hv of 20 or less. This sliding bearing is excellent in initial conformability and seizure resistance as compared with those of Patent References 1 and 2 but leaves something to be desired in physical properties required for automobile high speed engines.

In recent years, the performance of automobile engines have been remarkably enhanced for higher output and higher rotary speed, and the appearance of sliding bearings excellent in sliding properties, particularly initial conformability and seizure resistance, as well as in durability and heat resistance has been desired.

[Patent Reference 1] JP-A-4-83914
[Patent Reference 2] JP-A-7-247493
[Patent Reference 3] JP-A-2002-61652

DISCLOSURE OF THE INVENTION

An object of the present invention is to provide a sliding bearing having excellent initial conformability and seizure resistance as well as high durability and heat resistance, which are required especially for a high-speed engine.

In accordance with the present invention, a sliding bearing having the following constitution is provided to accomplish the aforesaid object of the present invention.

(1) A sliding bearing comprising a coating layer containing a resin and a solid lubricant formed on a bearing alloy layer, characterized in that the resin of said coating layer is a resin having a glass transition temperature of from 150° C. to 250° C.
(2) The sliding bearing as described in Clause (1), wherein the aforesaid resin is a polyamide-imide resin.
(3) The sliding bearing as described in Clause (1) or (2), wherein the glass transition temperature of the aforesaid resin is from 180° C. to 220° C.
(4) The sliding bearing as described in any one of Clauses (1) to (3), wherein the aforesaid resin has an elongation of from 5% to 60% at 25° C. or from 20% to 120% at 200° C.
(5) The sliding bearing as described in any one of Clauses (1) to (3), wherein the aforesaid resin has an elongation of from 10% to 50% at 25° C. or from 50% to 110% at 200° C.
(6) The sliding bearing as described in any one of Clauses (1) to (5), wherein the aforesaid resin has an elongation of from 20% to 30% at 25° C. or from 60% to 90% at 200° C.
(7) The sliding bearing as described in any one of Clauses (1) to (6), wherein the content of the aforesaid solid lubricant is from 30 to 70 vol-% in the coating layer.
(8) The sliding bearing as described in any one of Clauses (1) to (7), wherein the aforesaid solid lubricant is at least one selected from molybdenum disulfide, tungsten disulfide, graphite and boron nitride.
(9) The sliding bearing as described in any one of Clauses (1) to (8), which is used in internal combustion engine.

In order to enhance the initial conformability and the seizure resistance at a high speed, it is necessary that when the oil film becomes thin locally, giving a risk of solid contact, the overlay (resin coating layer) be rapidly abraded or deformed to assure the thickness of the fluid layer. Heretofore, this has been coped with by increasing the amount of a solid lubricant, but when the amount of the solid lubricant is increased too much, the fluid layer becomes brittle and, when peeled, causes easy seizure that deteriorates initial conformability. Then, the resin that binds the solid lubricant is improved into a resin having a satisfactory elongation and low tensile strength high temperatures to provide high conformability and seizure resistance, and a glass transition temperature of the resin was raised thereby capable of providing a sliding bearing having a solid lubricant resin coating layer with heat resistance and durability not deteriorated, and the present invention has been worked out.

BEST MODE FOR CARRYING OUT THE INVENTION

The sliding bearing of the present invention will be further described hereinafter.

The sliding bearing of the present invention is a sliding bearing comprising a coating layer containing a resin and a solid lubricant (hereafter sometimes referred to as a resin coating layer) formed on a bearing alloy layer, characterized in that the resin of said coating layer is a resin having a glass transition temperature of from 150° C. to 250° C.

The desirable resin which can be used in the coating layer is not specifically limited so far as the aforesaid requirements are satisfied, and its specific examples include thermoplastic resins such as polyimide resin, polyamide-imide resin and diisocyanate, BPDA and sulfone modification thereof and thermosetting resins such as epoxy resin and phenolic resin. In particular, polyamide-imide resins are preferably used in the present invention.

The glass transition temperature of the resin used in the coating layer of the present invention is from 150° C. to 250° C., preferably from 180° C. to 220° C. The glass transition temperature can be measured by means of a differential thermal analyzer.

By predetermining the glass transition temperature within the above defined range, the heat deterioration of the resin coating layer at high temperatures can be prevented and the heat resistance of the resin coating layer can be enhanced.

The elongation of the resin used in the coating layer of the present invention at 25° C. is preferably from 5% to 60%, more preferably from 10% to 50%, particularly from 20% to 30%.

Further, the elongation of the resin used in the coating layer of the present invention at 200° C. is preferably from 20% to 120%, more preferably from 50% to 110%, particularly from 60% to 90%.

Moreover, it is particularly preferred that the resin used in the coating layer of the present invention has an elongation of from 5% to 60% at 25° C. or from 20% to 120% at 200° C.

By setting the elongation of the resin within the above defined range, the break in the resin coating layer during bearing contact can be prevented and the initial conformability can be enhanced. The tensile strength of the resin used in the coating layer of the present invention is not specifically limited but is preferably low, particularly at a temperature as high as 200° C.

In the present invention, the aforesaid elongation is measured according to ASTMD-1708.

The polyamide-imide resin which can satisfy the aforesaid requirements for glass transition temperature and elongation can be obtained by predetermining the number-average molecular weight of the uncured resin to 20,000 or more to reduce the number of end crosslink points and adding a polymer containing an epoxy group to accelerate curing.

The solid lubricant which can be used in the present invention is not limited, but molybdenum disulfide ($MOS_2$), graphite (graphite), BN (boron nitride), tungsten disulfide ($WS_2$), PTFE (polytetrafluoroethylene), fluororesin, Pb, etc. can be exemplified. They may be used singly or in combination of two or more thereof.

The graphite may be either natural or artificial, but artificial graphite is preferred from the standpoint of abrasion resistance.

These solid lubricants act to reduce and stabilize friction coefficient and have conformability. In order to allow these actions to have sufficiently, the average particle diameter of the solid lubricant is preferably 15 μm or less, particularly from 0.2 to 10 μm. Preferred among these solid lubricants are molybdenum disulfide, tungsten disulfide, graphite (graphite) and boron nitride.

In the present invention, the content of the solid lubricant in the coating layer is preferably from 30 to 70 vol-%, more preferably from 30 to 50 vol-%.

Further, the content of the resin in the coating layer is preferably from 30 to 70 vol-%, more preferably from 50 to 70 vol-%. Moreover, in the present invention, the sum of the amount of the solid lubricant and the thermosetting resin is 100 vol-%.

By setting the rate of composition as described above, the solid lubricant can be firmly retained in the resin coating layer containing a soft resin having a good elongation at high temperatures to obtain better seizure resistance and conformability.

The resin coating layer of the sliding bearing of the present invention preferably further comprises a friction adjustor and/or an extreme-pressure agent incorporated therein. Examples of the extreme-pressure agent include sulfur-containing metal compounds such as $ZnS$, $Ag_2S$, $CuS$, $FeS$, $FeS_2$, $Sb_3S_2$, $PbS$, $Bi_2S_3$ and $CdS$; sulfur-containing compounds such as thirams, morpholine disulfide, dithionate, sulfides, sulfoxides, sulfonates, thiophosphinate, thiocarbonates, dithiocarbomates, alkylthiocarbamoyls and olefin sulfide; halogen-based compounds such as chlorinated hydrocarbon; thiophosphates such as zinc dithiophosphate; organic metal-based compounds such as thiocarbaminate; and organic molybdenum compounds such as molybdenum dithiophosphate and molybdenum dithiocarbiminate. Further, the average particle diameter of the extreme-pressure agent is preferably 5 μm or less, more preferably 2 μm or less. In the case where the extreme-pressure agent is added, the aforesaid solid lubricant is preferably replaced by the extreme-pressure agent in an amount of from 0.5 to 10 vol-%, particularly from 1 to 5 vol-% based on from 30 to 70 vol-% of the aforesaid solid lubricant.

The addition of the extreme-pressure agent makes it possible to obtain sufficient abrasion resistance or seizure resistance even under insufficient lubrication conditions causing temporary solid contact or in the case of uneven contact, etc. The action mechanism is uncertain, but it is presumed that the extreme-pressure agent dispersed in the resin coating layer acts effectively on the resin coating layer under such condition that the resin coating layer is easily broken due to frictional heat or shearing stress by temporary solid contact. In other words, it is presumed that the solid lubricant and the extreme-pressure agent contained in its film retain the oil firmly and the interfacial lubricant film is hard to be broken to result in a smooth sliding surface and hence seizure resistance and abrasion resistance can be maintained.

Examples of the friction adjustor include oxides such as $CrO_2$, $Fe_3O_4$, $PbO$, $ZnO$, $CdO$, $Al_2O_3$, $SiO_2$ and $SnO_2$, and compounds such as $SiC$ and $Si_3N_4$. In the case where the friction adjustor is added, the aforesaid solid lubricant is preferably replaced by the friction adjustor in an amount of from 0.3 to 10 vol-%, particularly from 0.5 to 5 vol-% based on from 30 to 70 vol-% of the solid lubricant. The addition of the friction adjustor makes it possible to enhance abrasion resistance. In particular, the use of the friction adjustor in combination with the extreme-pressure agent causes synergism of enhancement of abrasion resistance by the friction adjustor with retention of lubricant by the extreme-pressure agent, giving a further enhancement of abrasion resistance. The friction adjustor and the extreme-pressure agent may be used in combination, and in this case, the sum of the amount of the two components is preferably such that it replaces from 0.3 to 10 vol-%, particularly from 0.5 to 5 vol-% based on from 30 to 70 vol-% of the aforesaid solid lubricant.

The coating layer of the present invention may further comprise other additives incorporated therein.

In the present invention, in order to form the resin coating layer, a coating solution having the aforesaid components dissolved or dispersed therein is prepared. In this case, a proper amount of an organic solvent (diluent) may be used. Any organic solvent may be used without any limitation so far as it can adjust the viscosity of the resin to facilitate mixing and can dissolve the resin used therein.

For example, when the resin is a polyamide-imide resin, xylene, N-methyl-2-pyrrolidone, toluene or the like may be used in an amount of from 100 to 300 parts by weight based on 100 parts by weight of the sum of the amount of the aforesaid components.

In the present invention, a sliding bearing excellent in abrasion resistance and sliding properties can be obtained by applying a coating layer comprising the aforesaid resin and solid lubricant and optionally the friction adjustor and/or extreme-pressure agent over the surface of a bearing alloy layer to form a coat layer (resin coating layer).

As the bearing alloy to be used as bearing substrate there may be used copper alloy, aluminum alloy or the like. The bearing alloy is not specifically limited in its formulation, but as the aluminum alloy there may preferably be used an alloy comprising Cr, Si, Mn, Sb, Sr, Fe, Ni, Mo, Ti, W, Zr, V, Cu, Mg, Zn or the like in an amount of 10% by weight or less and one or more of Sn, Pb, In, Tl and Bi in an amount of 20% by weight or less. The elements belonging to the former group mainly provide strength and abrasion resistance while the elements belonging to the latter group mainly provide conformability. It is preferred that the former and the latter be used in combination.

The method for forming a resin coating layer on the bearing alloy layer will be described hereinafter. A bearing alloy such as copper alloy and aluminum alloy is formed into a sliding bearing-shaped lining which is subjected to degreasing in an alkaline treatment solution such as caustic soda and then subjected to rinsing and hot water washing to remove alkali attached to the surface thereof. For example, when it is necessary that the adhesion of the film be raised, a method which comprises roughening the surface of the lining by a chemical treatment such as alkaline etching after degreasing and acid washing in combination, a method which comprises roughening the surface of the lining by a mechanical treatment such as shot blasting or a method which comprises forming unevenness on the surface of the lining by boring may be employed. When it is necessary that the adhesion of the film be further raised, the surface of the lining may be subjected to formation with zinc phosphate or calcium zinc phosphate to a thickness of from 0.1 to 5 μm. The combination of base treatment such as boring with formation makes it possible to obtain a resin coating layer having an extremely high adhesion.

The lining which has been washed with hot water is dried with hot air, sprayed with the aforesaid coating solution diluted with a proper diluent, and then dried and sintered at 150° C. to 300° C. When the surface roughness of the film thus formed is too great, the lining is then subjected to smoothening such as buffing.

The spreading is accomplished by roll transferring, tumbling, dipping, brushing, printing or the like besides the aforesaid spraying method to form a resin coating layer. The thickness of the resin coating layer is preferably from 1 to 50 μm. In the case where coating is made on an aluminum bearing alloy or the like, when the curing temperature is more than 230° C., the generation of Sn in the aluminum bearing alloy can cause the deterioration of bearing performance. In this case, a resin which has maximum tensile hardness and elongation at a curing temperature of 230° C. or less is preferably used.

EXAMPLE

The present invention will be further described in the following examples, but the present invention is not limited thereto.

Examples 1-5 and Comparative Example 1

60 vol-% of a polyamide-imide resin (produced by Hitachi Chemical Co., Ltd.) set forth in Table 1, 40 vol-% of molybdenum disulfide as a solid lubricant and a proper amount of an organic solvent (N-methyl-2-pyrrolidone) were charged in a ball mill where they were then ground in admixture for 3 hours to prepare a coating solution for forming resin coating layer. Subsequently, the surface of a semicylindrical bearing to the back steel sheet of which a lining material made of an aluminum alloy (Al-11Sn-1.8Pb-1Cu-3Si) had been pressure-welded was degreased, and then roughened by shot blasting to a surface roughness Rz of 1 μm. Subsequently, the aforesaid coating solution was blown onto the surface of the bearing though an air spray to a thickness of about 6 μm, and then heated and cured at 180° C. to 230° C. for about 60 minutes to form a resin coating layer and hence produce a sliding bearing (overlay for metal).

TABLE 1

| | Tensile strength (MPa) | | Elongation (%) | | Glass transition temperature |
|---|---|---|---|---|---|
| | 25° C. | 200° C. | 25° C. | 200° C. | (° C.) |
| Example 1 | 60 | 25 | 10 | 45 | 150 |
| Example 2 | 60 | 25 | 10 | 45 | 180 |
| Example 3 | 70 | 25 | 30 | 70 | 200 |
| Example 4 | 40 | 15 | 30 | 70 | 220 |
| Example 5 | 30 | 10 | 50 | 90 | 230 |
| Comparative Example 1 | 60 | 25 | 10 | 45 | 140 |

In order to evaluate the properties of the various bearings thus obtained, initial conformability test and seizure resistance test were conducted.

The various tests were conducted in the following manners.

(1) Initial Conformability Test

The change of friction coefficient with gradual decrease of rotary speed from 1,300 rpm at a rate of 100 rpm/600 seconds with a lubricant 5W-30SH at a load of 20 MPa and 150° C. was measured.

(2) Seizure Resistance Test

The number of rotations required until seizure occurs during the gradual increase of rotary speed at a rate of 500 rpm/30 minutes to 8,000 rpm at maximum with a lubricant 5W-30SJ at a rotary load of 20 MPa and a lubricant temperature of 150° C. was examined. In this test, when the rotary speed increases, the temperature of the bearing rises, and those having a low heat resistance have deteriorated seizure resistance. In other words, since the higher the number of rotations causing seizure is, the higher is the heat resistance, the heat resistance was judged from the results of the test.

As can be seen in the results of the aforesaid test, the sliding bearings of Examples 1 to 5 haveed excellent initial conformability, seizure resistance and heat resistance. Further, the sliding bearings of Examples 3, 4 and 5, the resin coating layer of which was made of a resin having a remarkably great elongation at high temperatures and a high glass transition temperature, had remarkably excellent initial conformability. On the contrary, the sliding bearing of Comparative Example, the resin coating layer of which was made of a polyamide-imide resin having a poor softness and a small elongation at high temperatures, was made obvious to have poor seizure resistance and initial conformability.

While the present invention has been described in detail and with reference to specific embodiments thereof, it will be apparent to one skilled in the art that various changes and modifications can be made therein without departing from the spirit and scope thereof.

The present application is based on a Japanese Patent Application filed on Feb. 17, 2003 (Japanese Patent Application No. 2003-038625) the content of which is hereby incorporated by reference.

INDUSTRIAL APPLICABILITY

The sliding bearing of the present invention has excellent initial conformability and seizure resistance as well as high durability and heat resistance ad thus can be used as a sliding bearing for internal combustion engine of automobile and other industrial machines, particularly high speed engine.

The invention claimed is:

1. A sliding bearing, comprising:
  a bearing alloy layer; and
  a coating layer containing a resin and a solid lubricant formed on the bearing alloy layer;
  wherein the resin of said coating layer includes a resin having a glass transition temperature of from 150° C. to 250° C.,
  wherein the resin of the coating layer has an elongation of from 30% to 50% at 25° C., and
  the resin of the coating layer has a tensile strength of from 30 MPa to 40 MPa at 25° C.

2. The sliding bearing as described in claim 1, wherein the resin of the coating layer has an elongation of from 20% to 120% at 200° C.

3. The sliding bearing as described in claim 2, wherein the content of the solid lubricant is from 30 to 70 vol-% in the coating layer.

4. The sliding bearing as described in claim 3, wherein the solid lubricant is at least one selected from the group consisting of molybdenum disulfide, tungsten disulfide, graphite and boron nitride.

5. The sliding bearing as described in claim 4, wherein the sliding bearing is used in an internal combustion engine.

6. The sliding bearing as described in claim 1, wherein the resin of the coating layer includes a polyamide-imide resin.

7. The sliding bearing as described in claim 6, wherein the resin of the coating layer has an elongation of from 20% to 120% at 200° C.

8. The sliding bearing as described in claim 7, wherein the content of the solid lubricant is from 30 to 70 vol-% in the coating layer.

9. The sliding bearing as described in claim 8, wherein the solid lubricant is at least one selected from the group consisting of molybdenum disulfide, tungsten disulfide, graphite and boron nitride.

10. The sliding bearing as described in claim 9, wherein the sliding bearing is used in an internal combustion engine.

* * * * *